Feb. 2, 1954
J. P. HENDERSON ET AL
2,667,860
PRESSURE RESPONSIVE VALVE POSITIONER
Filed April 26, 1952
2 Sheets-Sheet 1
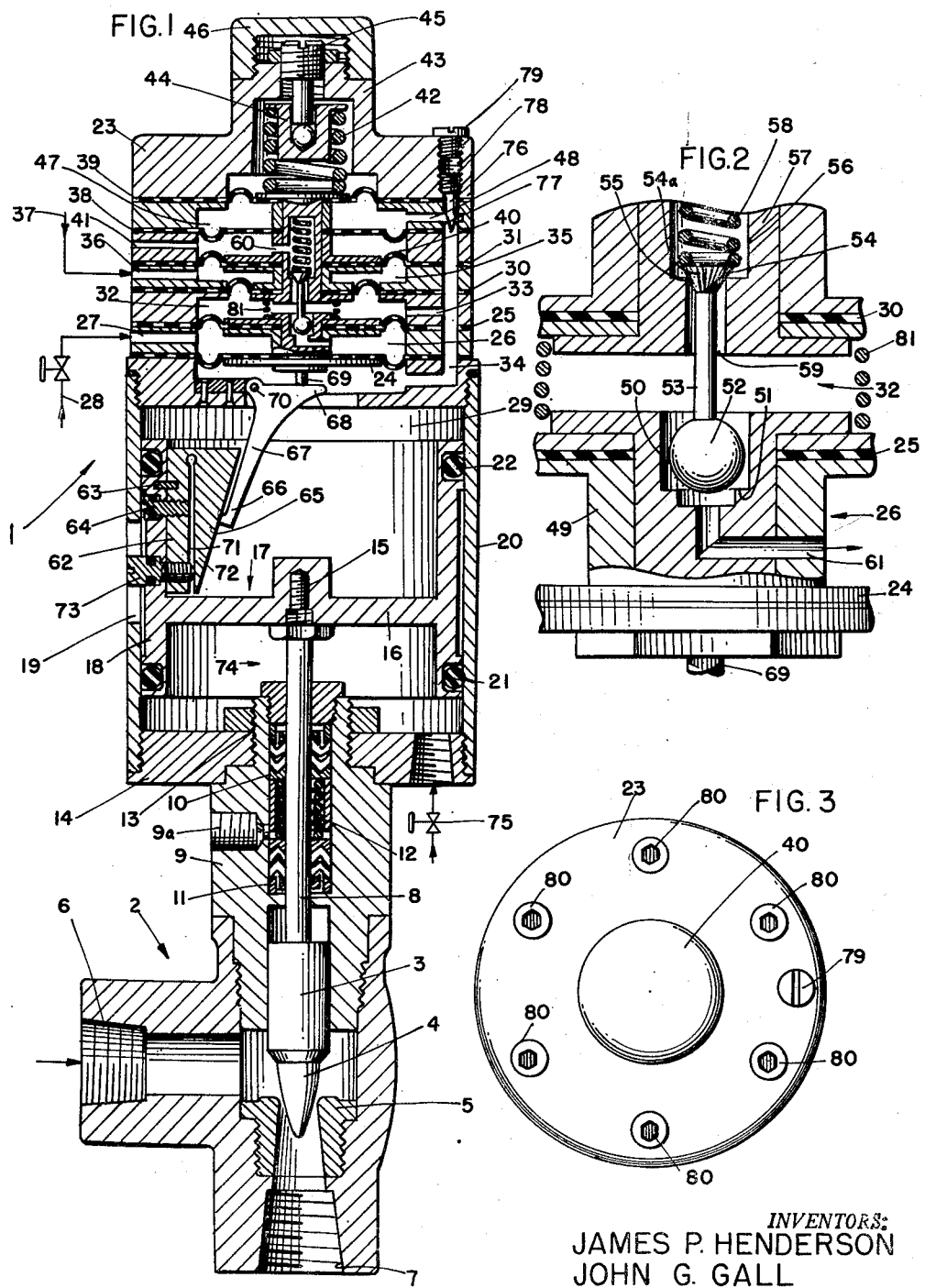
INVENTORS:
JAMES P. HENDERSON
JOHN G. GALL
BY:
Spencer Johnston,
Cook & Root
ATT'YS Feb. 2, 1954   J. P. HENDERSON ET AL   2,667,860
PRESSURE RESPONSIVE VALVE POSITIONER
Filed April 26, 1952   2 Sheets-Sheet 2
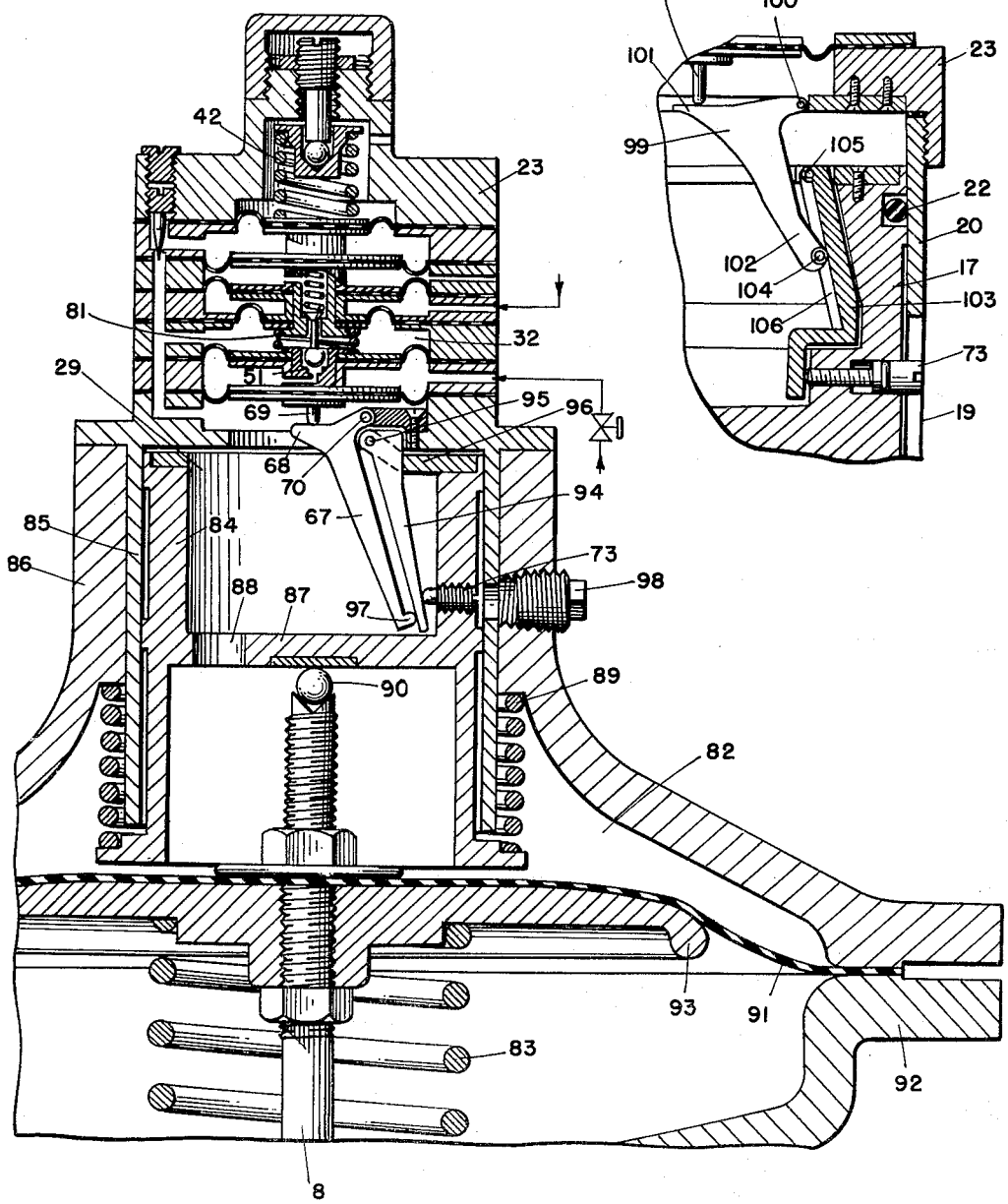
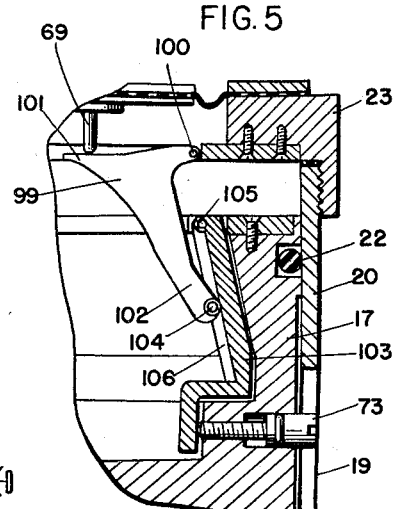
INVENTORS:
JAMES P. HENDERSON
JOHN G. GALL
BY: Spencer, Johnston,
Cook & Root
ATT'YS Patented Feb. 2, 1954

2,667,860

UNITED STATES PATENT OFFICE 2,667,860

PRESSURE RESPONSIVE VALVE POSITIONER

James P. Henderson, La Grange Park, and John C. Gall, Chicago, Ill., assignors to McAlear Manufacturing Company, Chicago, Ill., a corporation of Illinois Application April 26, 1952, Serial No. 284,674

4 Claims. (Cl. 121—41)

This invention relates to a positioning apparatus and more particularly to an apparatus for making small changes in the position of an automatically controlled element such as a valve disc, sluice gate, louvre, damper, aileron, etc., with great accuracy.

Various types of apparatus are known for positioning valves and other devices in response to the action of a spring-loaded bellows on a pivoted lever. The lever is repositioned by the action of compensating levers. Considerable leverage is required and friction in the lever system limits the accuracy of positioning.

In a type of device used for positioning a valve the compound lever system of the above described apparatus is replaced by a compression spring to absorb motion of the main valve stem and apply a reactive thrust proportional to the movement of the stem. Because of the phenomenon of hysteresis, the spring does not resume the same length after reduction of the compressive load that it occupied before compression. The accuracy of positioning the valve disc is thereby limited in this type of device.

It is an object of this invention to provide a reliable, accurate, rapidly operating positioning apparatus which is substantially free from frictional effects and hysteretic losses.

Another object of the invention is to provide a sensitive, rugged positioner which is actuated and controlled by fluid pressure.

A further object of the invention is to provide an actuating device of the piston or diaphragm type which is movable with great accuracy in response to a change in fluid pressure.

Still another object of the invention is to provide a valve positioner having a system of diaphragms which regulate the flow of a fluid under pressure to a piston or diaphragm.

Another object of the invention is to provide a positioner in which a rebalancing follow-up is effected by cam means.

Another object of the invention is to provide a positioner in which a rebalancing follow-up is effected by a cam means which means is readily adjustable to compensate for departure from the specified spring rate of a range spring.

Another object of the invention is to provide a rebalancing cam means which is readily adjustable to fit the stroke of a valve without changing parts.

A still further object of the invention is to provide means for adjusting the rate of response of the positioning device.

The foregoing and numerous other important objects, advantages and inherent functions of the invention will become apparent as the same is more fully understood from the following description, which, taken in connection with the accompanying drawings, discloses a preferred embodiment of the invention.

In the drawings:

Figure 1 is a vertical sectional view of one embodiment of the valve positioning apparatus according to this invention;

Figure 2 is an enlarged sectional view of the double disced valve illustrated generally in Figure 1;

Figure 3 is a top plan view of the apparatus shown in Figure 1;

Figure 4 is a vertical sectional view of the positioner applied to a spring return diaphragm operated valve; and Figure 5 is a fragmentary sectional view similar to Figure 4 but illustrating another embodiment of the cam arrangement of the invention.

In accomplishing the foregoing objects and in accordance with the present invention there is now provided an apparatus for positioning a remote member rapidly and accurately. A particular feature of the invention is a cam means operatively associated with a positioning apparatus to control it by restoring the position of a portion of the apparatus in response to stroking of the remote member. The apparatus is operable in response to controlled fluid pressure and comprises in addition to the cam means a fluid pressure operated divider or diaphragm means operatively associated with a member to be positioned, guide means associated with said divider or diaphragm means and movable axially within a casing, means on one side of said divider or diaphragm means for constantly urging said first means in one direction, means for supplying pressure to the opposite side of the divider or diaphragm means in response to the output of a fluid pressure controller. This last-named means is a plural diaphragm unit.

The invention further provides means for adjusting and limiting the rate of flow of fluid pressure between the chambers of the plural diaphragm unit, thereby controlling and speeding up the rate of change of the actuating fluid pressure applicable to the diaphragm or divider means and thereby providing a more positive and rapid response to changes in controller output pressure.

Referring to the drawings in detail the valve positioning apparatus I is shown in a preferred arrangement in which it is located above a valve 2, the disc 3 of which is to be positioned. The tip 4 of the valve disc 3 is adapted to seat in a valve seat 5 and thereby to control the flow of fluid passing between the inlet 6 and the outlet 7. The disc 3 has attached thereto a valve stem 8 which reciprocates within a body 9 and is surrounded by the upper and lower packing glands 10 and 11. A spring 12 is provided which encircles the stem 8 and bears against the packing glands 10 and 11, thereby forcing them to contact the stem 8 in fluid-tight engagement. A weep hole 9a projects through the body 9.

The stem 8 extends into the cylinder 20 through the threaded opening 13 in the end portion 14 thereof. The end 15 of the stem 8 is adapted for threaded engagement with a threaded opening in the horizontal divider 16 of a piston 17. The vertical portion 18 represents the circumference of the piston 17 and is adapted to engage the annular casing 20. Annular packing rings 21 and 22 move with the piston 17 and maintain fluid-tight engagement between the guide and the casing 20. A window or slit 19 is provided in casing 20 to receive the head of a screw 73. The head of the screw 73 also serves as an index to indicate the position of the valve disc.

The diaphragm-containing body 23 is engaged with the top of the wall 20 and is adapted to contain a plurality of diaphragms. The body 23 is made up of a plurality of spacer discs interposed between the diaphragms and adapted to be fastened together by means of the long bolts 80 (Fig. 3). The several diaphragms are more conveniently grouped into a lower diaphragm assembly and an upper diaphragm assembly. The lower assembly comprises the diaphragm 24 and the diaphragm 25. An annular space 26 is formed between the diaphragms 24 and 25 and is adapted to receive a supply of air at regulated pressure through the opening 27, which is connected to a regulated air supply 28. The chamber 29 extends from the underside of the diaphragm 24 down to the divider 16 in the piston 17.

An upper diaphragm assembly having a lower portion comprising a small lower diaphragm 30 and a larger upper diaphragm 31 in spaced relationship is located above the diaphragm 25 and is separated therefrom by the spring 81 and the annular space 32. The space 32 is connected by means of the conduit 33 to a larger conduit 34 which connects with the space 29. The diaphragms 30 and 31 are separated by an annular space 35 which is connected through the port 36 to a source of air under variable pressure 37, as from a controlling apparatus (not shown).

The upper diaphragm assembly also having an upper portion comprising a large diaphragm 38 and a smaller diaphragm 39 in spaced relationship is located above the diaphragm 31 and spaced therefrom by the annular space 40. This space 40 exhausts to the atmosphere through the port 41 in the body 23. The upper assembly is normally urged downwardly by means of the spring 42. The spring is located in the head 43 of the body 23 and is held in position by means of the recessed plug 44 which receives the adjusting screw 45. A cap 46 is adapted to fit on the head 43 and to protect the screw 45 from accidental movement. The annular space 47 exists between the diaphragms 38 and 39 and is connected to the large conduit 34 by means of the small conduit 48. Thus it will be seen that the space 47 and the space 32 are interconnected with the large chamber 29 and that changes in the pressure in any one of the spaces will be transmitted through the conduit 34 to the other spaces.

The internal balance of forces on the diaphragms which separate the spaces 29, 26, 32, 40 and 47 is achieved through the operation of a double-disced valve which operates between the lower diaphragm assembly and the upper diaphragm assembly in response to movements thereof. The details of this valve are shown in Figure 2 in which the lower diaphragm 24 and the upper diaphragm 25 of the lower diaphragm assembly contain a valve receiving member 49. A lower valve member 50 is affixed to the member 49 and the seat 51 thereof is adapted to receive a valve disc member in the form of a ball 52. A stem 53 attaches the ball 52 to a disc 54 which is adapted to contact the seat 55 of a valve member 56 in a valve receiving member 57 attached to the diaphragms 30, 31, 38 and 39, the upper diaphragm assembly. A relatively weak spring 58 normally urges the disc 54 into engagement with the seat 55, thereby closing the conduit 59 and preventing passage of air from the space 32 upwardly through the port 60 and space 40 and thence to the atmosphere through port 41. A conduit 61 connects the valve member 50 with the space 26 between the diaphragms 24 and 25 and will allow free passage of air between the space 26 and the space 32 whenever the ball 52 is raised from the seat 51. The spring 58 engages an upper portion of the valve receiving member 57 of the upper assembly.

At one point on the circumference of the vertical portion 18 of the guide or piston 17 there is positioned a cam member 62 which is fixed to the portion 18 by means of the dowel pin 63 and the screw 64. The inclined surface 65 of the cam 62 is adapted to be engaged by one arm 66 of a lever 67, the other arm 68 of which is in engagement with a pin 69 which is part of valve member 50 of the lower diaphragm assembly. The lever 67 is pivotally connected at 70 to the base of the diaphragm-containing body or casing 23. The slot 71 makes it possible to change the angle of the cam surface 65 in response to the movement of the screw 73, the cam body portion 72 being made of a resilient material.

An air supply at constant pressure is provided to the space 74 between the piston 17 and the end portion 14 of the cylinder 20. The valve 75 is a combination pressure and relief regulator which may be set so as to add air to the space 74 upon outward movement of the piston 17 or to allow air to escape the space 74 upon inward movement of the piston, at all times maintaining the pressure in the space 74 at a normally constant value.

A diagrammatically illustrated variable restriction 76 is employed in order to limit free passage of air between the conduit 34 and the space 47. The disc 77 is adapted to seat into the conduit 34 in order to regulate the flow of air therethrough. The position of the valve 76 is adjusted by the set screw 78 in the body 23 and is protected by means of the screw 79.

In the operation of the positioner it may be assumed that a specific pressure exists in chamber 35; that the forces applied to the position are in equilibrium and the piston is stationary at a position within the limits of its stroke. A reduction of pressure in chamber 35 will then allow the spring 42 to force the diaphragms 39, 38, 31 and 30 downwardly and likewise move the double-disced valve downwardly. In normal operation the spring 58 will force the disc 54 into contact with the seat 55, and through the stem 53 will force the ball 52 into contact with the seat 51, thereby closing the conduit 61 and preventing passage of air from the chamber 26 to the chamber 32. As the upper diaphragm assembly continues to move downwardly in response to the urging of the spring 42, the disc 54 will be lifted from the seat 55 to open the conduit 59 and allow the passage of air from the chamber 32 through the port 60 to the chamber 40 and outwardly to the atmosphere through the port 41. Since the chamber 32 is interconnected with the chambers 29 and 47, the pressure above the piston 17 will be reduced to a value lower than the pressure in the chamber 74 which is maintained at a constant pressure. The piston will then tend to move upwardly, carrying with it the cam 62. The lever 67 will then be rotated around the pivot 70 and the lower diaphragm assembly will tend to be depressed downwardly by the action of the spring 81, keeping pin 69 in contact with arm 68 of lever 67.

As the lower diaphragm assembly is depressed downwardly, it carries with it the lower valve seat 51. This action allows disc 54 to engage seat 55 and close port 59 under the urging of spring 58. A further downward motion of the lower diaphragm assembly disengages the seat 51 from the ball 52 and allows the passage of air under pressure through the conduit 61 into the chamber 32 and through the conduits 33 and 34 into the chambers 29 and 47. When the force developed by the pressure in chamber 29 exceeds the combined resistance to motion of the piston and stem, then the piston 17 will be forced downwardly, carrying with it cam 62 which in turn rotates lever 67 about pivot 70, thereby urging the lower diaphragm assembly upwardly through pin 69 which is at all times in contact with lever arm 68. This cycle is repeated until the forces acting on both sides of the divider 16 are in balance and piston 17 is in equilibrium at a position in exact accordance with that required by the pressure in chamber 35.

If, however, the pressure within the chamber 35 is increased, such as by the addition of air under pressure through the port 36 from an outside source, such as the output of a pneumatic control apparatus, the equilibrium will be disturbed and the valve positioning apparatus will act to reach a new equilibrium. As the pressure within the chamber 35 is increased, the upper diaphragm assembly will be forced upwardly against the force of the spring 42 and carrying with it the valve seat 55 and the valve disc 54, thereby closing passage 59. The motion of the disc 54 will be transmitted to the ball 52 through the stem 53 and will lift the ball from its seat 51. Air under regulated pressure will then pass through the conduit 61 from the chamber 26 into the chamber 32 and will increase the pressure within the chamber 29 to a value in excess of the combined resistance of the piston and stem, thereby forcing the piston 17 downwardly. Here again, as the piston descends, the action of the cam 62, the lever 67 and the pin 69 will take place to force the lower diaphragm assembly upward and cause a reduction in opening between the seat 51 and the ball 52, thereby throttling the flow of air between the chambers 26 and 32. If the piston should descend too far, the seat 51 will continue to rise, engage ball 52 and unseat disc 54 whereupon air will pass from the chamber 32 through the conduits 59 and 60 into the chamber 40 from which it exhausts to the atmosphere through the port 41. This dissipation of air pressure will soon reduce the pressure in the chambers 32 and 29 and the piston 17 will rise, with corresponding lowering of the seat 51, the ball 52 and the disc 54. The disc 54 will re-engage the seat 55 and stop the escape of air to the atmosphere. The cycle is repeated until a new equilibrium position has been reached by the piston, this position again being a function of the pressure within the space 35 in the upper assembly. So long as there is a deviation in the valve position from that position exactly corresponding to the pressure applied in chamber 35, there will exist an imbalance of forces which will increase until the piston moves to eliminate the deviation.

The upper portion of the upper diaphragm assembly comprising the diaphragms 38 and 39 and the air chamber 47 are provided to compensate for the tendency of the upper diaphragm assembly to move in response to a variation of air pressure in chamber 32. When the pressure in chamber 35 increases to raise ball 52 from seat 51, air under pressure flows from the chamber 26 to the chamber 32 and upwardly through the conduit 34 to the chamber 47. The effective area of diaphragm 38 is greater than the effective area of diaphragm 39 by an amount equal to the effective area of diaphragm 39. Therefore the upward force developed on the underside of diaphragm 30 by a change of pressure in chamber 32 is balanced by an equal and opposite force downwardly in chamber 47 and the upper diaphragm assembly remains responsive only to a change of pressure in chamber 35.

In practice a slight flow of air is allowed to escape past the valve disc 54 through the small groove 54a when the disc is seated. This causes the ball 52 to remain free from the seat 51 by the slight clearance required to replace air escaping from the chamber 32 to the atmosphere when the system is in equilibrium.

It will be understood that when there is no restriction to flow of air from chamber 32 to chamber 47 through conduit 34, the stroking of the upper diaphragm assembly and therewith the ball 52 is dependent only and is directly related to a change of pressure in chamber 35. By restricting the flow of air from chamber 32 to 47, the change in pressure in chamber 47 lags behind the change of pressure in chamber 32, thereby causing the upper diaphragm assembly with ball 52 temporarily to move farther than that required by the pressure change in 35, until the forces in chamber 32 and 47 are equal and opposite at which time the ball 52 will again be restored to a position in correspondence with the pressure in chamber 35. The above action results in a more rapid change in the position of the piston than the rate of change of position of the piston which would result from a change of pressure in chamber 35, if there were no restriction to flow in conduit 34. The variable restriction in conduit 34 therefore provides a means of altering the rate of response of the piston to a change in input control pressure.

The spring rate of the spring 42 establishes the range of pressure to which the unit is responsive, and the limits of this range are determined by adjustment of the screw 45. It will be apparent that the rise of the cam 62 bears a definite relation to the spring rate of spring 42. Because of the difficulty in winding commercial coil springs to a specified spring rate, we have found it possible to adjust the rise of the cam in order to compensate for deviations from the specified spring rate of the spring 42. As shown in Figure 1, the base of the cam 62 is fastened to the piston 17. The outer portion 72 of the cam may be urged away from the body of the cam 62 at the bottom by means of adjustments of the screw 73. By adjusting the screw inwardly the rise of the cam along the surface 55 can be reduced to a value corresponding to the spring rate of the spring 42.

The embodiment of the invention illustrated in Figure 4 shows the application of the positioner to a spring return diaphragm motor valve of conventional type. In Figure 4 the diaphragm assemblies in the body 23 are the same as in Figure 1 and operate in the same way. Hence, it will not be necessary to describe them in detail at this time. The pressure in the dome 82 will be of a value to balance the thrust of the compression spring 83 at any position in the stroke of the valve stem 8 when the system is at equilibrium. It will be observed that a guide 84 is adapted to reciprocate within the sleeve 85 which in turn is affixed to the bonnet 86 of the diaphragm motor valve. A divider 87 corresponds generally to the divider 16 in Figure 1 except that it has an opening 88 therethrough which connects the chamber 29 with the dome 82. The effect of this arrangement is to allow free communication of the pressure from the chamber 32 in the valve positioner with the chamber 29 and the dome 82. The spring 89 serves to maintain the guide 84 through the ball 90 in continual contact with the stem 8 throughout the complete stroke thereof. A diaphragm 91 of the conventional resilient type is provided and is secured between the bonnet 86 and the lower casing 92 of the diaphragm motor valve. A conventional disc 93 is attached to the stem 8 and is movable therewith along the axis of the stem.

In Figure 4 a somewhat different arrangement of the adjustable cam element is shown along with a means for adjusting the cam rise to fit the spring rate of the spring 42. The cam 94 is pivoted at 95 on a projection 96 of the guide 84. The attitude of the face of the cam 94 may be adjusted by means of the screws 73 by advancing or retracting the screw in its threaded opening. The rider 97 of the lever 67 is maintained in contact with the face of the cam 94 by the thrust of the spring 81 transmitted mechanically through the lower diaphragm assembly, the pin 69 and the arm 68 of the lever 67. The same effect may be obtained by stressing the lower diaphragm assembly upwardly when assembling the apparatus and then allowing the air pressure to overcome the stress to position pin 69 firmly against lever 68. The lever 67 is rotatable around the pivot 70. By driving the screw 73 inwardly it is possible to change the slope of the cam face 94 with respect to the longitudinal axis of the valve stem 8. In this manner the magnitude of restoration of the valve seat 51 is lessened relative to the stroke of the valve stem 8. A removable screw 93 is provided in the bonnet 86 in order to provide access to the screw 73 for adjustment thereof.

A different embodiment of the cam adjusting mechanism of the invention is shown in Figure 5. The mechanism to which this embodiment is applied is generally similar to that illustrated in Figure 1 in which a casing 20 is attached to the positioner body 23 and has a window or slit 19 therein to receive the head of an adjusting screw 73. Here again the head of the screw 73 serves as an index to indicate the position of the valve disc. A packing ring 22 is provided to maintain fluid-tight engagement between the piston 17 and the casing 20. A lever 99 is pivoted at 100 on a projection of the body 23. One arm 101 of the lever 99 engages the pin 69 which is a part of the valve member 50 of the lower diaphragm assembly. Another arm 102 of the lever 99 is adapted to engage the cam member 103 through the roller or rider 104. The cam 103 is pivoted at 105 to the piston 17. The cam 103 is free to move at its lower end in response to movement of the screw 73. The roller 104 is adapted to move in the channel 106 which is dish-shaped in order to allow for slight rotative movement of the piston 17 within the casing 20.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention. It will be understood that the invention is applicable to the positioning of devices other than valves in response to the output of a fluid pressure controller.

The invention is hereby claimed as follows:

1. A valve positioning device operable in response to the output of a fluid pressure controller comprising a casing, fluid pressure operated means operatively associated with a member to be positioned, guide means associated with said means and movable axially within said casing, means on one side of said first means adapted to continually urge said first means in one direction, a plural diaphragm means for supplying pressure to the opposite side of said first means in response to the output of a fluid pressure controller including a source of fluid pressure, a lower diaphragm assembly and an upper diaphragm assembly, valve seats in each assembly, a double disced valve adapted to seat in said valve seats and a main spring normally urging said upper assembly toward said lower assembly, and cam means operatively associated with said member adapted to control the positioning of said lower assembly valve seat in response to movement of said member.

2. A valve positioning device operable in response to the output of a fluid pressure controller comprising a casing, fluid pressure operated means operatively associated with a member to be positioned, guide means associated with said means and movable axially within said casing, means on one side of said first means adapted to continually urge said first means in one direction, a plural diaphragm means for supplying pressure to the opposite side of said first means in response to the output of a fluid pressure controller including a source of fluid pressure, a lower diaphragm assembly and an upper diaphragm assembly, valve seats in each assembly, a double-disced valve adapted to seat in said valve seats and a main spring normally urging said upper assembly toward said lower assembly, and means adapted to control the positioning of said lower assembly valve seat in response to movement of said member including an adjustable cam element operatively associated with said member and a lever pivotally mounted for engagement with said cam and said seat.

3. A valve positioning device operable in response to the output of a fluid pressure controller comprising a casing, fluid pressure operated means operatively associated with a member to be positioned, guide means associated with said means and movable axially within said casing, means on one side of said first means adapted to continually urge said first means in one direction, a plural diaphragm means for supplying pressure to the opposite side of said first means in response to the output of a fluid pressure controller including a source of fluid pressure, a lower diaphragm assembly and an upper diaphragm assembly, valve seats in each assembly, a double-disced valve adapted to seat in said valve seats and a main spring normally urging said upper assembly toward said lower assembly, and means adapted to control the positioning of said lower assembly valve seat in response to movement of said member including an adjustable cam element operatively associated with said member, a lever pivotally mounted for engagement with said cam and said seat and means for varying the pitch of said cam member to match the spring rate of said main spring.

4. A valve positioning device operable in response to the output of a fluid pressure controller comprising a casing, fluid pressure operated means operatively associated with a member to be positioned, guide means associated with said means and movable axially within said casing, means on one side of said first means adapted to continually urge said first means in one direction, a plural diaphragm means for supplying pressure to the opposite side of said first means in response to the output of a fluid pressure controller including a source of fluid pressure, a lower diaphragm assembly and an upper diaphragm assembly, valve seats in each assembly, a double-disced valve adapted to seat in said valve seats and a main spring normally urging said upper assembly toward said lower assembly, and cam means operatively associated with said member adapted to control the positioning of said lower assembly valve seat in response to movement of said member, a portion of said upper diaphragm assembly adapted to resist movement of said assembly in one direction in response to fluid pressure communicated thereto and adjustable restricting means associated with said portion for controlling the rate of application of said resistance.

JAMES P. HENDERSON.
JOHN C. GALL.

References Cited in the file of this patent

UNITED STATES PATENTS

| Number | Name | Date |
|---|---|---|
| 2,044,936 | Donaldson, Jr. | June 23, 1936 |
| 2,098,914 | Gorrie | Nov. 9, 1937 |
| 2,291,048 | Lichtenstein | July 28, 1942 |
| 2,382,941 | Moore | Aug. 14, 1945 |
| 2,411,748 | Kelley | Nov. 26, 1946 |
| 2,536,184 | Johnson | Jan. 2, 1951 |
| 2,558,506 | Annin | June 26, 1951 |
| 2,612,870 | Roetter | Oct. 7, 1952 |